United States Patent Office 3,147,208
Patented Sept. 1, 1964

3,147,208
PROCESS FOR THE HYDROCRACKING OF HYDROCARBONS WITH A COBALT-MOLYBDENUM ON SILICA-ALUMINA SUPPORT TYPE CATALYST
Marvin F. L. Johnson, Homewood, Ill., assignor to Sinclair Research, Inc., Wilmington, Del., a corporation of Delaware
No Drawing. Filed Mar. 12, 1962, Ser. No. 179,207
3 Claims. (Cl. 208—111)

The present invention relates to the conversion of mineral oil feedstocks. More specifically, the invention concerns the hydrocracking of oils in the presence of a certain macro-size catalyst containing cobalt and molybdenum on a silica-alumina support.

Silica-alumina supports containing as promoters oxides of cobalt and molybdenum, cobalt molybdate, etc. are commonly employed as catalysts in the hydrocracking of hydrocarbon feedstocks. They have been used in various sizes ranging from very finely divided particles to relatively large or macro-size particles. The viscous nature of oils oftentimes precludes employment of fluidized bed operations and for this and other reasons the conversion is generally accomplished in fixed beds. Fixed bed operations ordinarily employ the catalyst in relatively large particle size or shaped into a macro-size by pilling, pelleting, extrusion, tableting, etc. for use of the catalyst in too small a subdivided form, usually 10 to 50 mesh, although more active than the larger particle size or macro-shaped catalysts, creates an unduly high pressure drop across the fixed bed.

In the preparation of macro-sized catalyst by the pelleting, pilling, etc. of small subdivided catalyst particles for use in the hydrocracking of hydrocarbon stocks, selection of subdivided particles having too small a mesh size, is ordinarily avoided since the pore diameter of the macro-catalyst resulting from, for instance, pelleting or tableting of particles of very small mesh seriously limits the ability of the hydrocarbon stocks to diffuse into the catalyst.

It has now been discovered that the formation of a macro-catalyst of cobalt and molybdenum-promoted silica-alumina particles having a range size of 200 to 325 mesh provides a surprisingly active catalyst for the hydrocracking of mineral oil feedstocks. The results are all the more surprising when considered in light of the fact that use of particle sizes above and below this range, i.e., 100–200 mesh and less than 325 mesh result in an inferior macrocatalyst.

In accordance with the process of the present invention a petroleum oil feedstock, preferably a residual oil, is contacted under hydrocracking conditions with a fixed bed of macro-size catalyst formed from particles of silica-alumina promoted with catalytic amounts of cobalt and molybdenum, said particles having a range size of 200 to 325 mesh. The hydrocracking conditions employed are those of the art and generally include temperatures of about 650° F. to 950° F., pressures of about 400 to 4000 p.s.i.g., space velocities of about 0.3 to 10 WHSV (weight of feed per weight of catalyst per hour) and about 1000 to 10,000 standard cubic feet of hydrogen per barrel of residual feed.

The silica-alumina support of the present invention contains a predominant amount of silica, i.e., at least about 50% silica up to about 95% silica, preferably about 70 to 90% silica. The synthetic type of silica-alumina, such as coprecipitated silica-alumina and alumina precipitated on silica, commonly employed in the art as cracking catalysts are suitable supports for the catalysts of the present invention. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The production of synthetic catalysts can be performed, for instance, (1) by impregnating silica with aluminum salts; (2) by direct combination of precipitated (or gelated) hydrated alumina and silica in appropriate proportions; or (3) by joint precipitation of alumina and silica from an aqueous solution of aluminum and silicon salts. The resulting silica-alumina is then dried generally at a temperature of about 170° F. to 400° F. for at least 6 hours and up to 24 hours or more with a slow stream of air to carry off the water vapor.

To produce the catalyst of the present invention, the silica-alumina can be subjected to a grinding operation and particles in a range size of above 200 to 325 mesh selected onto which the cobalt and molybdenum components are deposited. Alternative to a grinding operation, the particles of defined size can be formed by pumping an aqueous slurry of the silica-alumina with a high pressure pump into a spray drier and atomizing the silica-alumina at high pressure, say 700–1000 lbs. in an atomizer of hot air having an inlet temperature of, for instance, 1000 to 1100° F. Deposition of the cobalt and molybdenum components can be accomplished by any method known to the art, for instance, by impregnation, precipitation and coprecipitation with compounds of cobalt and molybdenum. For example, the silica-alumina particles can be mixed with aqueous solutions of water-soluble compounds of the cobalt and molybednum metals such as cobalt nitrate and ammonium molybdate so that the metal components are adsorbed on the base. Alternatively, the promoting materials can be precipitated on the silica-alumina base through suitable reaction of an aqueous slurry of the silica-alumina containing water-insoluble salts of the promoting metals. The water-insoluble compounds are usually inorganic and in the form of oxide, hydroxides, carbonates, basic carbonates and sulfides.

The total amount of active metal components on the silica alumina can vary considerably while being sufficient to afford a substantial catalytic effect. In general, this amount is a minor portion of the catalyst and may be as low as 0.1 weight percent of the finished catalyst. Usually the total active metal components can comprise about 0.1 to 30 weight percent of the finished catalyst and each component is at least about 0.05 weight percent of the finished catalyst. The individual metallic components will frequently be about 1 to 5 percent of the cobalt component and about 5 to 25 percent of the molybdenum component. All of these percentages are calculated as weight percent of the finished catalyst on a metal oxide basis.

The impregnated finely divided particles are then generally dried and formed into a macro-sized particle of say about $\frac{1}{16}$ to $\frac{1}{2}$ inch in width or diameter, about $\frac{1}{16}$ to 1 inch or more in length, commonly about $\frac{1}{16}$ to $\frac{1}{2}$ inch in length. The forming may be done by tableting, pelleting, extruding or other conventional means. Before or after the forming process the macro-size of catalyst is calcined to activate the base and promoting metals and remove water. The calcination is generally conducted at temperatures of about 500 to 1500° F. or more for a period of about 2 to 36 hours and preferably in a manner minimizing contact time of the catalyst with water vapor at the temperatures encountered. While the calcination will generally be conducted in air, it is also feasible to carry out the same in other oxidizing atmospheres, a reducing atmosphere such as, for example, hydrogen or methane, or an inert atmosphere, such as nitrogen.

The catalyst employed in the process of the present invention can be easily regenerated employing conventional procedures, for instance, by subjecting it to an oxygen-containing gas at temperatures sufficient to burn off carbon deposited on the catalyst during the hydrocracking. This oxygen-containing gas, e.g., an oxygen-nitrogen mixture can contain about 0.01 weight percent to 5 weight percent oxygen and is introduced at a flow rate such that the maximum temperature at the site of combustion is below about 100° F.

The feedstock of the present invention is preferably a petroleum residual boiling essentially above about 600° F., exemplified, for example, by vacuum residua, atmospheric residua, tars, pitches, etc. The process has particular applicability to asphalt-containing residuals boiling essentially above 650° F. and having an ASTM penetration at 77° F. of up to about 200.

The following examples are included to further describe the present invention.

EXAMPLE I

Nalco high alumina cracking catalyst ($SiO_2$:25% $Al_2O_3$ was ground and divided into mesh size ranges of (1) less than 325 mesh, (2) 200–325 mesh, and (3) 100–200 mesh. Catalysts were prepared from each of the three mesh ranges of silica-alumina by impregnating with a mixed solution of cobalt nitrate and ammonium para molybdate, drying, mixing the dried mixture with sterotex die lubricant, tableting into 1/8" by 1/8" tablets and calcining at a temperature of about 1050° F. for approximately 3 hours. Inspections of the prepared catalyst are shown in Table I below:

Table I

| Identification | <325 mesh before forming | 200–325 mesh before forming | 100–200 mesh before forming |
|---|---|---|---|
| Sample Number | I | II | III |
| Crush No./1/8" length | 12.9 | 11.5 | 12.3 |
| Apparent Density, gm./cc. | 0.68 | 0.71 | 0.75 |
| $N_2$ Area | 344 | 344 | 332 |
| Total Pore Vol. cc./gm. | 0.542 | 0.456 | 0.411 |
| Percent VM | 0.62 | 0.82 | 1.10 |
| Particle Size | 1/8" pellet | 1/8" pellet | 1/8" pellet |
| Macropores: | | | |
| Most Probable size | 12,000 A. | 7,000 A. | 5,000 A. |
| Volume | 0.157 | 1.212 | 0.063 |
| Co | 2.44 | 2.34 | 2.4–2.79 |
| $MoO_3$ | 8.97 | 8.75 | 10.0 |

The catalysts were employed in the hydrocracking of a sour West Texas asphalt having the following physical properties:

° API ......................... 9.2
Micro, percent:
  C .......................... 85.34
  H .......................... 10.57
  O .......................... 0.58
  N .......................... 0.40
  S .......................... 2.83
Viscosity:
  FV at 210 .................. 565
  FV at 275 .................. 77.7
Carbon residue D189 .......... 17.70
$C_5$ insolubles ............. 12.31
NiO, p.p.m. .................. 30
$V_2O_5$, p.p.m. ............. 50

The hydrocracking process in each case included pretreating the catalyst with 10 cubic feet/hr. of hydrogen at 750° F. and 1 atmosphere and contacting the feed with the catalyst in the presence of molecular hydrogen successively for 4 hours at 750° F., 4 hours at 820° F. and then 10 hours at 820° F., 1000 p.s.i.g., 0.8 LHSV (liquid hourly space velocity), and 6000 s.c.f./b.b.l. once through hydrogen. The results of each run are summarized in Table II below.

Table II

| Catalyst No. | Mesh Size | Pore Volume | $H_2$ Consumption, s.c.f./bbl. | Δ °API | Percent Desulfurization | Conversion to 950° F. |
|---|---|---|---|---|---|---|
| Sample I | <325 | 0.542 | 583 | 7.8 | 53 | 35.7 |
| Sample II | 200–325 | 0.456 | 704 | 8.6 | 60 | 45.2 |
| Sample III | 100–200 | 0.411 | 598 | 6.7 | 43 | 32.9 |

Examination of the data of Table II shows that a cobalt molybdate macro-catalyst employing a silica-alumina of a mesh range of 200–325 as the support produces a hydrocracking catalyst of unexpectedly high activity as demonstrated by the high hydrogen consumption, desulfurization and conversion to 950° F. minus products.

I claim:
1. The process for hydrocracking petroleum feedstocks which comprises contacting said feedstock under hydrocracking conditions including a temperature of about 650 to 950° F. and in the presence of molecular hydrogen with a macro-size catalyst consisting essentially of catalytic amounts of cobalt and molybdenum on a silica-alumina support, which catalyst prior to macro-size formation has a mesh size range of 200 to 325.

2. The process of claim 1 wherein the feedstock is a petroleum residual oil boiling primarily above 600° F.

3. The process for hydrocracking petroleum feedstocks which comprises contacting said feedstock under hydrocracking conditions including a temperature of about 650 to 950° F. and in the presence of molecular hydrogen with a fixed bed of macro-size catalyst of about 1/16 to 1/2 inch diameter and about 1/16 to 1/2 inch length consisting essentially of catalytic amounts of cobalt and molybdenum on a silica-alumina support containing about 70 to 90 percent silica, which catalyst prior to macro-size formation has a mesh size range of 200 to 325.

References Cited in the file of this patent
UNITED STATES PATENTS
2,488,027    Page              Nov. 15, 1949
2,902,431    Dinwiddie et al.      Sept. 1, 1959

UNITED STATES PATENT OFFICE
CERTIFICATE OF CORRECTION

Patent No. 3,147,208                                            September 1, 1964

Marvin F. L. Johnson

It is hereby certified that error appears in the above numbered patent requiring correction and that the said Letters Patent should read as corrected below.

Column 3, line 8, for "100° F." read -- 1000° F. --; line 21, for "(SiO$_2$:25% Al$_2$O$_3$" read --(SiO$_2$:25% Al$_2$O$_3$) --; same column 3, Table 1, third column, under the heading "200-325 mesh before forming", for "1.212" read -- 0.122 --.

Signed and sealed this 27th day of April 1965.

(SEAL)
Attest:

ERNEST W. SWIDER                                       EDWARD J. BRENNER
Attesting Officer                                          Commissioner of Patents